Figure 1:
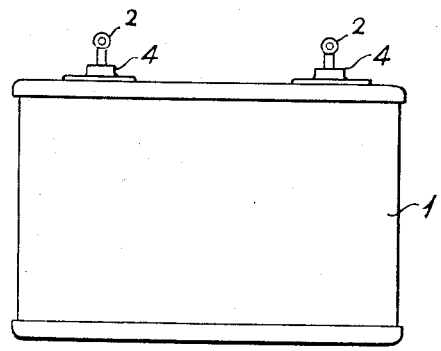

May 12, 1959

A. GRIEVE ET AL 2,885,826

GLASS-TO-METAL SEALS

Filed Nov. 18, 1955

INVENTORS,
ALEXANDER GRIEVE,
WILLIAM JOSEPH SCOTT

By Miles L. Pillans

HIS ATTORNEY

United States Patent Office 2,885,826
Patented May 12, 1959

2,885,826
GLASS-TO-METAL SEALS

Alexander Grieve and William Joseph Scott, Rugby, England, assignors to The British Thomson-Houston Company Limited, London, England, a British company Application November 18, 1955, Serial No. 547,786

Claims priority, application Great Britain December 21, 1954

2 Claims. (Cl. 49—81)

This invention relates to the protection of glass-to-metal seals against the corrosion produced by a humid atmosphere and/or electrolytic action where the metal sealed to the glass is readily oxidisable.

Glass-to-metal seals are employed in many ways for providing a hermetic seal around an electric conductor where it is led into a container and the container is to be isolated from the atmosphere or evacuated or filled with a gas or vapour.

The metal used in such glass-to-metal seals is frequently of a readily oxidisable nature and commonly consists of a cobalt, nickel, iron alloy, the thermal expansion characteristic of which is such that it can be readily sealed to a boro-silicate glass. Such seals have been employed in connection with electrical apparatus hermetically sealed in a casing so that the apparatus within the casing can be operated without deterioration in the humid atmosphere met with in tropical countries.

It has been found that, in such conditions, when the conductor insulatingly led through the wall of the casing through the glass-to-metal seal is carrying unidirectional current, corrosion may be initiated at the seal as a result of electrolytic action, the corrosion spreading along the surface of the metal exposed to the atmosphere and eventually causing the seal to fail.

Attempts have been made to overcome this difficulty by electroplating the seal subsequent to its manufacture, but this has not proved satisfactory since corrosion starts under the imperfect joint of the electroplating and the glass and the insulation resistance of the glass deteriorates to a prohibitively low value as corrosion products produced mainly by electrolysis migrate onto the glass surface.

The object of the present invention is to provide an improved seal which will withstand the conditions above mentioned.

According to the invention, the metal to which the glass is sealed is covered by any suitable means prior to the production of the glass-to-metal seal with a layer or layers of metal or metals which is/are not readily corrodible under the conditions of use.

Thus, in a hermetic seal for an electric conductor through the wall of a container consisting of glass sealed by fusion to the conductor, the glass constituting either a part of said wall or being sealed by fusion to a surrounding metal part which is sealed hermetically to said wall, the conductor or the surrounding metal part or both consisting of a ferrous metal or alloy which is readily oxidisable under humid conditions; according to the invention the ferrous metal or alloy is coated, at least at the region of the intended seal and prior to sealing to the glass with a metal or metals which is, or are, not readily corrodible in the said conditions and which does not adversely affect the adherence of the glass to the metal.

Figure 2:
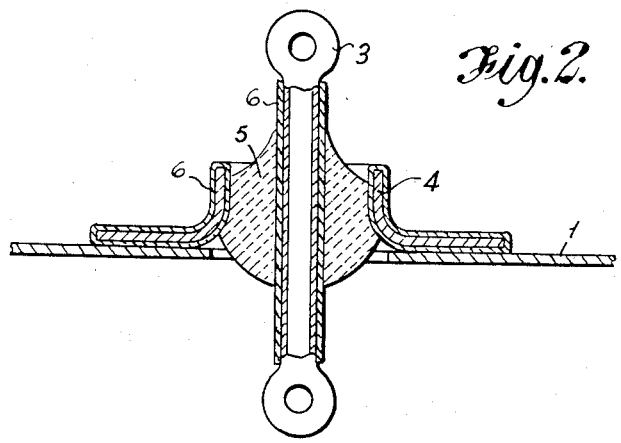

The invention will be better understood on reference to the following description taken in connection with the accompanying drawings, in which Fig. 1 shows a hermetically sealed component, the glass-to-metal seals forming the terminals of which are prepared in accordance with the invention, and Fig. 2 is an enlarged view in cross-section of one of the terminal seals.

Referring to the drawings, we have shown in Fig. 1 a sealed metal casing 1, which may contain a component, such as a transformer which is to be protected against the effects of humid conditions, e.g. for use in certain tropical atmospheres. Terminals 2 are led through the casing, the terminals being each required to be insulated from the casing and to provide a hermetic seal, whereby to prevent the atmosphere from reaching the interior of the casing and the transformer mounted therein.

The terminal seals are each constituted of glass and metal members, the glass being sealed by fusion to the metal members. As shown in Fig. 2, the metal members consist of a central conductor 3, forming the terminal and an outer metal bushing or eyelet 4, and the glass 5 is hermetically sealed between the conductor 3 and the eyelet 4. The eyelet is in turn mounted on the wall of the casing 1, as by soldering, and surrounds an aperture therein by means of which the terminal is adequately insulated from the casing 1.

In order to provide a hermetic seal, the thermal expansion characteristics of the glass and metal sealed together must be suitably matched and the glass must also adhere to the metal. In order to satisfy these conditions, the metal to which the glass is sealed may consist of an iron-nickel-cobalt alloy, such as that known as Fernico or Nilo K, while the glass may be a borosilicate glass containing approximately 66% silica, 24% boric oxide, about 8% of alkali oxide, and the remainder alumina. The ferrous alloy above mentioned is, however, readily corrodible in humid conditions, with the result that the adequacy of the seal may be impaired since the corrosion may extend along the metal-glass interface.

We have found that by providing on the surface of the metal parts 3 and 4, a coating of a metal which protects the metal parts from corrosion while not impairing the seal between glass and metal, the corrosion may be substantially prevented. Accordingly, we may provide the metal parts with a surface layer 6 of rhodium which may be produced in any convenient manner, e.g. by electroplating. Preferably, we first apply to the base or foundation metal a coating of silver also by electroplating; the underlying coating of silver serves to prevent attack of the ferrous alloy by the rhodium plating solution. If the silver coating is between .0003" and .0005" thick and the rhodium coating is from .00003" and .00005" thick, a satisfactory seal can be made between the boro-silicate glass and the coated ferrous alloy if the seal is made at a temperature of approximately 900° C. It is preferable to fire in hydrogen the metal parts at a temperature of above 900° C. before applying the coating metal in order to obviate blistering of the plating which may occur if the ferrous alloy is not so treated. The required thickness of the coatings depends on the freedom from porosity of the rhodium layer and in some cases may be outside the limits of thickness above mentioned.

The protective coating may be applied to the whole of the conductor 3 and the eyelet 4, or may be applied only to the region of the intended seal between glass and metal, or to the regions at which the metal-glass interface is exposed to the atmosphere.

In carrying out the invention, where the metal to which the glass is sealed consists of an iron-nickel-cobalt alloy, we have found that the desired protection of the seal can be obtained by first electroplating the metal parts with a coating of silver and then applying to the silver plated surface a layer of rhodium. If the silver coating is between .0003" to .0005" thick and the rhodium coating is from .00003" to .00005" thick, a satisfactory seal between the glass and the metal can still be made when the glass is a boro-silicate glass containing approximately 66% silica, 24% boric oxide, about 8% of alkali oxide and the remainder alumina, provided that the seal is made at a temperature of approximately 900° C., the required thickness of the coatings depending on the freedom from porosity of the rhodium layer and may be outside the limits above mentioned. It is preferable to hydrogen fire the alloy at over 900° C. before plating to obviate blistering of the plating which sometimes occurs if the metal is not so treated.

The purpose of the silver coating is to prevent attack of the alloy by the rhodium plating solution. If economy is essential, it is sufficient to plate only that area of the alloy adjacent to the region where the metal emerges from under the glass. If desired, further plating, e.g. tin or gold, may be added after sealing.

The technique may also be applied to multiple seals.

What we claim as new and desire to secure by Letters Patent of the United States is:

1. The method of producing a hermetic seal between a boro-silicate glass and a metal member composed of an alloy of cobalt, nickel and iron and having a thermal expansion characteristic which is suitably matched to that of the glass, protecting the materials against the corrosive effect of a humid atmosphere which consists in firing the metal member in an atmosphere of hydrogen at a temperature over 900° C., electrolytically forming a coating of rhodium on the metal member at least over the region of the intended seal of maximum thickness of one ten-thousandth of an inch, and then forming the seal between the glass and the coated metal member.

2. The method of producing a hermetic seal between a boro-silicate glass and a metal member composed of an alloy of cobalt, nickel and iron and having a thermal expansion characteristic which is suitably matched to that of the glass, protecting the materials against the corrosive effect of a humid atmosphere which consists in firing the metal member in hydrogen at a temperature above 900° C., electroplating the metal member at least over the region of the intended seal with a layer of silver, electrolytically depositing a layer of rhodium on the layer of silver of a maximum thickness of one ten-thousandth of an inch, and then sealing the glass to the coated metal member at a temperature of about 900° C.

References Cited in the file of this patent

UNITED STATES PATENTS

| | | |
|---|---|---|
| 1,189,194 | Eldred | June 27, 1916 |
| 1,232,074 | Norwood | July 3, 1917 |
| 1,947,180 | Bart | Feb. 13, 1934 |
| 1,949,131 | Shields | Feb. 27, 1934 |
| 2,053,765 | Dana | Sept. 8, 1936 |
| 2,109,138 | Maulen | Feb. 22, 1938 |
| 2,684,886 | Briggs | July 27, 1954 |

OTHER REFERENCES

Transactions of the Electrochemical Society, vol. 80, 1941, pages 489–498.